(12) United States Patent
Parillo et al.

(10) Patent No.: US 7,210,986 B2
(45) Date of Patent: May 1, 2007

(54) SYSTEM AND METHOD FOR DUPLICATING KEYS

(76) Inventors: Michael Parillo, 986 Route 130 North, North Brunswick, NJ (US) 08902; Edward Baker, 38 Livingston La., Manalapan, NJ (US) 07726

( * ) Notice: Subject to any disclaimer, the term of this patent is extended or adjusted under 35 U.S.C. 154(b) by 93 days.

(21) Appl. No.: 10/373,443

(22) Filed: Feb. 25, 2003

(65) Prior Publication Data

US 2003/0129930 A1    Jul. 10, 2003

Related U.S. Application Data

(63) Continuation-in-part of application No. 09/792,378, filed on Feb. 23, 2001, now abandoned.

(51) Int. Cl.
*B24B 1/00* (2006.01)
*B23C 1/16* (2006.01)

(52) U.S. Cl. ............................ 451/45; 76/110; 409/81; 451/125; 451/237; 451/452

(58) Field of Classification Search ................. 76/110; 409/81, 82, 132; 451/45, 125, 178, 231, 451/237, 238, 312, 451, 452, 457
See application file for complete search history.

(56) References Cited

U.S. PATENT DOCUMENTS

|   |   |   |   |   |
|---|---|---|---|---|
| 983,787 | A | * | 2/1911 | Wakeland ..................... 409/81 |
| 1,775,921 | A | * | 9/1930 | Williams ..................... 409/81 |
| 3,675,536 | A | * | 7/1972 | Hungerford et al. .......... 409/83 |
| 3,807,276 | A | * | 4/1974 | Oliver .......................... 409/81 |
| 3,902,382 | A | * | 9/1975 | Lieptz .......................... 76/110 |
| 4,051,748 | A | * | 10/1977 | Sherman ...................... 76/110 |
| 4,657,448 | A | * | 4/1987 | Alexander ................... 409/81 |

* cited by examiner

*Primary Examiner*—Timothy V. Eley
(74) *Attorney, Agent, or Firm*—Brian K. Dinicola

(57) ABSTRACT

A key duplication system employs a modular key duplication attachment in combination with a high-speed, rotary powered tool and a profiled abrasive cutter. The attachment comprises a base, a carriage assembly movable relative to the base, a profiled stylus secured to the carriage, a first clamping vise for retaining a specimen key at a fixed (i.e., stationary) position relative to the base and a second clamping vise for retaining a key blank at a fixed position relative to the base. When so-retained, a bottom flat surface of the specimen key and a bottom flat surface of the key blank rest in a common plane and the tip of each key is separated by a first distance. The cutter and stylus are aligned such that movement of the carriage, relative to the base, simultaneously brings them both into contact with appropriate surfaces of the key blank and the specimen key, respectively.

24 Claims, 2 Drawing Sheets

SYSTEM AND METHOD FOR DUPLICATING KEYS

REFERENCE TO RELATED APPLICATIONS

This application is a continuation-in-part of U.S. patent application Ser. No. 09/792,378 filed on Feb. 23, 2001 and entitled "Key Duplication Attachment Device For Rotary Tool With Profiled Abrasive Cutter", now abandoned.

BACKGROUND OF THE INVENTION

1. Field of the Invention

This invention relates generally to key duplication and, more particularly, to portable systems adapted to machine one or more key blanks to thereby produce a corresponding number of duplicates of an original key.

2. Discussion of the Background Art

The need to fabricate duplicate keys undoubtedly dates back to the earliest implementation of the lock. As such, the earliest methods of making duplicate keys were the exclusive province of skilled artisans who used files and other hand tools to slowly shape a small section of metal into the desired key form. The electric motor, of course, made it possible to mechanize the process of forming and shaping duplicate keys, and a key of moderate complexity can typically be duplicated—by a relatively unskilled worker—in a matter of minutes. Since its introduction and subsequent widespread commercial acceptance, however, the mechanized key duplication system has changed very little over the years.

In a conventional key duplication system, a specimen key with the essential pattern profile (i.e., an "original" key) is placed into a first vise clamp. A key blank to be contoured with the essential pattern is placed into a juxtaposed second vise clamp. The specimen key is brought into contact with a guiding stylus, while the key blank is brought into contact with a belt-driven cutting wheel dimensioned and arranged to revolve at approximately 450 to 1700 rpm. A carriage associated with the vise clamps is then shifted laterally and angularly reoriented inwardly and outwardly, such that the engagement of the specimen key with the stylus imparts a corresponding pivotal movement of the carriage and the teeth of the cutting wheel cut a corresponding contour pattern into the key blank. When this process has concluded, the key blank is removed from the vise clamps, and any burrs or other imperfections formed during the cutting operation are removed with a file or a buffing wheel.

Notwithstanding the widespread commercial use of conventional key duplication systems, there are several deficiencies associated with them. For example, the belt system used to drive the rotating cutting wheel is subject to a substantial amount of slip, reducing its efficiency and precision. Wear in the pivot points that support the key clamping vises further diminishes the precision required to produce a usable working key. The impact of the cutting teeth against the blank key, repeated many times during a single duplicating operation, may force a key requiring deep cuts, lands and/or contours to shift or jump out of even the most securely tightened clamping vise jaws. Efforts to compensate for this tendency have involved elaborate clamping vise jaw configurations, but this approach has met with only limited acceptance because the lands and grooves of many keys are lower than the top edge of the "improved" vise jaws—preventing their duplication.

The need to accommodate many modern key configurations have exposed further limitations in the design of conventional key duplicating equipment. For example, the ignition keys for many domestic and foreign vehicles are double sided with lands and grooves on the lip extension of both sides. Most keys contain one or more extended step on each side. When duplicating keys of this type, the step(s) must rest on the top surface of the vise clamp jaws, while the lip must extend between the jaws of the vise. After one side of such a key is cut, the lip may become too short to grip securely while cutting the other side. Thus, there is an increased risk that the force of the impact—from the cutter against the blank being duplicated—will cause a shifting or throwing out of the key blank. Not surprisingly, conventional key duplicating machines produce a high percentage of unusable duplicate keys.

Still other disadvantages associated with conventional key duplicating equipment include the development of unnatural high pitched sounds injurious to the operator's hearing, and the dulling or breakage of the heat-treated tool steel cutting teeth. In fact, cutting tooth breakage is so common that despite the widespread use of steel keys, a major manufacturer of key cutting wheels warns that its cutters should not be used to cut steel keys.

A continuing need therefore exists for a key duplicating system which is simple to operate, inexpensive to fabricate, and accurate enough to produce usable duplicate keys. A continuing need also exists for a key duplication system that is both portable and modular in construction so that it may be used in conjunction with an existing rotary power tool.

SUMMARY OF THE INVENTION

The aforementioned needs are addressed, and an advance is made in the art, by a key duplication system that employs a modular key duplication attachment device specifically adapted for use in combination with a high-speed, rotary powered tool and a profiled abrasive cutter.

In accordance with an illustrative embodiment of the present invention, the key duplication attachment device comprises a base, a carriage assembly movable relative to the base, a profiled stylus secured to the carriage and movable therewith, a first clamping vise securable to the base and dimensioned and arranged to retain a specimen key at a first fixed (i.e., stationary) position and a second clamping vise securable to the base and dimensioned and arranged to retain a key blank at a second fixed position. When so-retained, a bottom flat surface of the specimen key and a bottom flat surface of the key blank rest in a common plane and the tip of each key is separated by a first distance.

The carriage assembly further defines an opening dimensioned and arranged to receive and retain a high-speed, rotary power tool. The key duplication system of the present invention further includes a profiled abrasive cutter adapted to be rotated, at a high rate of speed, by the rotary power tool. The abrasive cutter and carriage assembly opening are dimensioned and arranged so that when the high-speed, rotary power tool is retained within the opening, the corresponding engagement surfaces of the profiled abrasive cutter and the profiled stylus are aligned. Specifically, the cutter and stylus are aligned such that movement of the carriage, relative to the base, simultaneously brings them both into contact with appropriate surfaces of the key blank and the specimen key, respectively. To this end, the respective engagement surfaces of the stylus and abrasive cutter are separated by the same distance as the tips of the specimen key and key blanks.

In operation, the carriage is manipulated by the operator so as to bring the stylus into contact with the specimen key.

In accordance with an illustrative embodiment of the invention, the carriage is hingedly secured to the base so that the stylus may be swung into and out of engagement with the specimen key. At the same time, the abrasive cutter is rotating at a high speed and is brought into engagement with the key blank. The resulting grinding action quickly removes material from the key blank. The carriage is also configured for lateral movement relative the base, so that the engagement surface of the stylus may be brought into engagement with the specimen key at any point along its length. As will be readily appreciated by those skilled in the art, the corresponding movement of the abrasive cutter results in a duplicate key having the same contour as the specimen key.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The invention will be better understood by reference to the detailed description of the invention that follows, taken in conjunction with the accompanying drawings, in which.

DETAILED DESCRIPTION OF THE INVENTION

Figure 1:
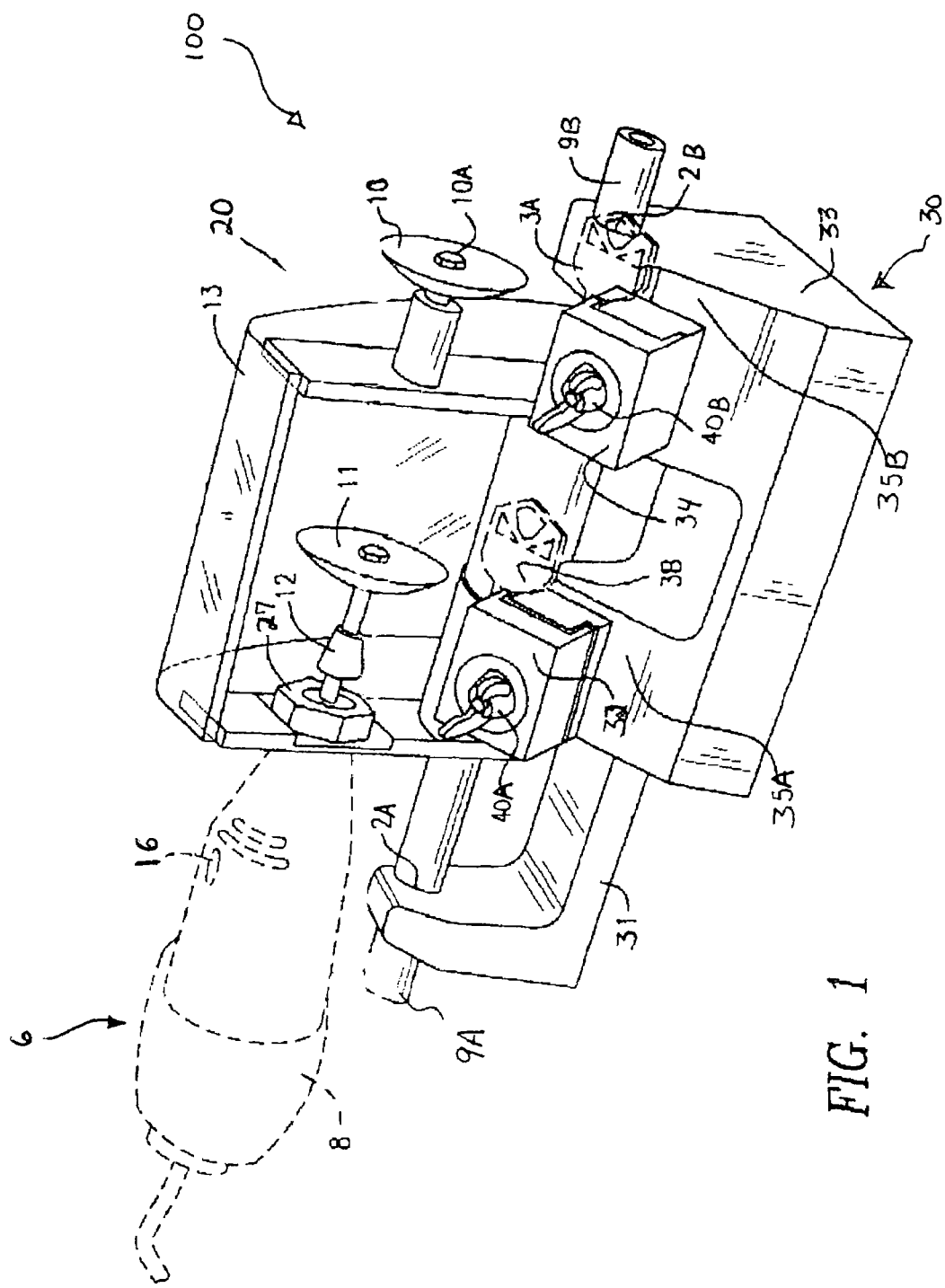
FIG. 1 is a perspective view of a fully assembly key duplication system constructed in accordance with an illustrative embodiment of the present invention.

With initial reference to FIG. 1, there is shown an improved key duplicating system 100 constructed in accordance with an illustrative embodiment of the present invention. As seen in FIG. 1, key duplicating system 100 includes a carriage assembly indicated generally at reference numeral 20 and a stationary base indicated generally at reference numeral 30. Together, carriage assembly 20 and stationary base 30 constitute a key duplicating attachment or module adapted, as will be explained in greater detail shortly, for use in conjunction with a high speed motor such, for example, as that normally found in a conventional, high-speed rotary tool. An illustrative rotary tool, indicated generally at reference numeral 6 in FIG. 1, is shown in dotted line form and includes an elongated dielectric housing 8 having a threaded tip, an on/off switch 16, and a central shaft adapted to rotate at speeds of at least 8,000 to 30,000 rpm. To the central shaft is attached a conventional retaining element or chuck 12.

Figure 2:
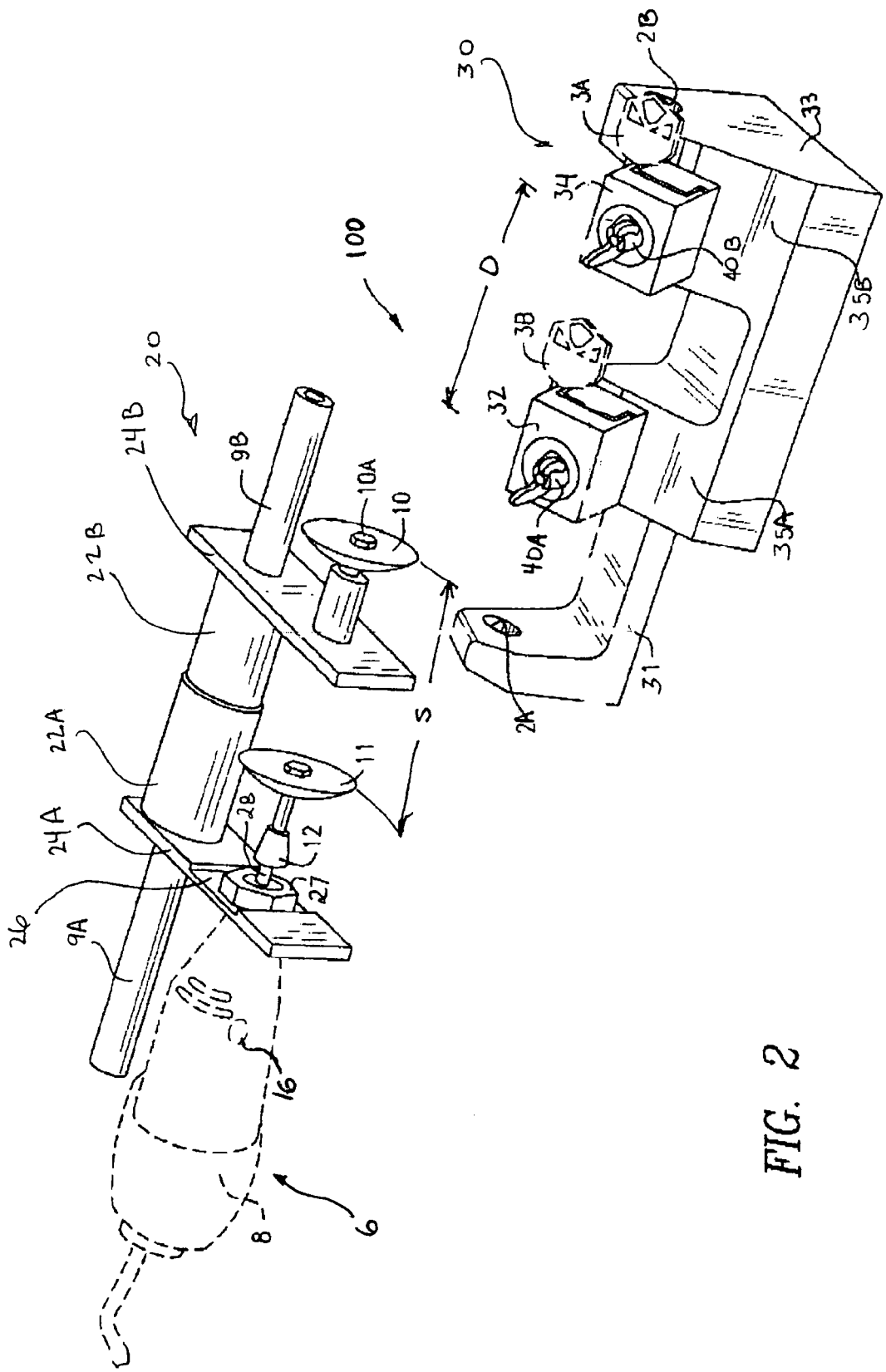
FIG. 2 is an exploded perspective view of the illustrative embodiment of FIG. 1, with the carriage being depicted with its safety cover removed and separated from the base.

Turning briefly to FIG. 2, it will be seen that carriage assembly 20 is an elongated structure which includes a pair of horizontal journals 9A and 9B respectively dimensioned and arranged for insertion into corresponding bearing supports 2A and 2B that are defined at opposite ends of stationery base 30. For a reason that will soon become readily apparent, this arrangement accommodates both linear and angular translation of carriage assembly 20 relative to stationary base 30. In the illustrative embodiment of FIGS. 1 and 2, carriage assembly 20 is divided into telescoping first and second sections 22A and 22B. As will be readily appreciated by those skilled in the art, this telescoping configuration enables journals 9A and 9B to be moved inwardly into a compact position permitting their alignment with bearing supports 2A and 2B. Journals 9A and 9B are thereafter spread apart until they are fully extended into the positions shown in FIG. 1. A suitable locking mechanism such as a set screw or the like (not shown) is used to maintain sections 22A and 22B in the spread apart position shown. It should be noted that the aforementioned telescoping journal configuration is described by way of illustrative example only and that other attachment configurations are also possible. Indeed, by way of additional example, base extension arm 31, which defines bearing support 2A, can be implemented as a structure that is linearly adjustable relative to primary base section 33.

In any event, and with continued reference to FIG. 2, it will be seen that carriage assembly 20 further includes a pair of parallel retaining arms 24A and 24B. Retaining arm 24A defines a reduced-thickness mounting region 26 through which a mounting bore (not shown) extends. Attachment of rotary tool 6 to carriage assembly 20 is achieved by inserting the threaded tip of dielectric housing 8 through mounting region 26 and then tightening threaded locking nut 27. A profiled abrasive cutting element indicated generally at 11 is retained within a chuck 12 affixed to the rotary shaft 28 of rotary tool 6. Profiled stylus 10 is adjustably secured to retaining arm 24B by bolt and lock nut assembly 10A.

With continuing reference to FIG. 2, it will be seen that a key blank 3B is secured to the stationary base at a first location and an original key 3A is secured to the stationary base at a second location. In the illustrative embodiment depicted in FIGS. 1 and 2, the key blank and original key are secured by first and second clamping devices indicated generally at 32 and 34, respectively. Both the key blank and the original key are retained at a fixed distance relative to one another and also at a fixed angular orientation relative to one another (that is, they lie in a common plane). Preferably, clamps 32 and 34 are mounted at an incline relative to an underlying horizontal support surface so that only small angular movements of carriage assembly 20 are needed and so that the operator can observe the key duplication progress without undue strain. To this end, primary base section 33 defines first and second inclined mounting surfaces 35A and 35B dimensioned and arranged to support clamping devices 32 and 34, respectively. Clamping devices 32 and 34 themselves are configured, in the illustrative embodiment of FIGS. 1 and 2, as vises secured by clamp-vise wing nuts 40A and 40B.

Returning now to FIG. 1, it will be appreciated that the journals 9A and 9B within guide bearing supports 2A and 2B allow for the swinging upwardly and downwardly of carriage assembly 20 relative to base assembly 30. As such, profiled abrasive grinding element 11 and profiled stylus 10 may be brought into and out of engagement with corresponding surfaces of the key blank and original key. A transparent safety cover indicated generally at 13 is securable to the carriage and adapted for angular and linear movement therewith. Transparent cover 13 is dimensioned and arranged to act as a shield covering the key and key blank when stylus 10 and cutting element 11 are moved into engagement with the original key and key blank, respectively.

Operation of the system 100 proceeds after the appropriate power rotary tool as tool 6 is attached to retaining arm 24A. In that regard, the rotary tool may be powered by 120 V A/C single phase household line current, by a battery source, or even by pneumatic means (e.g., compressed air). Securing nut 27 is turned clockwise to secure rotary tool 6 to carriage assembly 30. The profiled abrasive key grinder arbor assembly 11 is slipped into the tool chuck 12, with lateral alignment being controlled by an increased diameter stop on the arbor of the grinder cutter assembly 11 that is tightened securely in tool chuck 12.

Original or specimen key 3A is positioned within vise clamp 34 and key blank 3B is positioned within vise clamp 36. The vise clamps are tightened by rotating respective wing nuts 40A and 40B. To align specimen key 3A with key blank 3B, the profiled stylus 10 is brought into engagement with an extension on the key called the key shoulder and/or the tip end of the keys. This results in a precise lengthwise positioning of specimen key 3A relative to key blank 3B. The lengthwise spacing D (FIG. 2) between the tips or other corresponding alignment surfaces is exactly matched by the lengthwise spacing S (FIG. 1) between the flat side surfaces of the profiled abrasive rotary grinder 11 and stylus 10.

To achieve the corresponding exact spacing, the telescoping capability of carriage assembly sections 22A and 22B can be readily exploited. That is, the relative distance and angular orientation of abrasive grinding element 11 may be readily adjusted relative to stylus 10 by loosening the set screw (not shown) and then swivelling and/or sliding sections 22A and 22B relative to one another as necessary to obtain the requisite spacing and alignment. By way of illustration, the stylus is first brought into contact with a selected reference surface region along specimen key 3A. Then, section 22A is slid linearly and/or angularly relative to section 22B until abrasive grinding element 11 is brought into contact with the corresponding target surface region on key blank 3B.

Advantageously, the dielectric housing 8 of rotary tool 6 can serve as the graspable handle for angularly and linearly moving carriage assembly 20 relative to base 30. Alternatively, a separate handle may be attached to retaining member 24A or other portion of carriage assembly 20. In either event, the carriage is controllably moved so as force grinding element 11 into contact with the blank key and stylus 10 into contact with specimen key 3A. High speed (e.g. 8,000 to 40,000 rpm) rotation of the rotary shaft causes the abrasive grinding element to cut grooves and other reference surface features of specimen key 3A into the surface of key blank 3B.

As used herein, the phrase "abrasive cutting element" refers to a rotary element having an abrasive surface that is dimensioned and arranged to remove material from a key blank solely by abrasion. Specifically excluded from this definition, then, are cutting element surfaces that remove material from the key blank by milling action. The operative surface of the abrasive cutting element may, for example, be obtained by coating a profiled structure otherwise identical to stylus 10 with a conventional abrasive material as, for example, particles of silicon carbide, aluminum oxide.

From the foregoing, it will be appreciated that the use of a profiled abrasive grinding or cutting element, rotated by a rotary power tool so as to produce cutting surface speeds ranging from 8,000 to 30,000 rpms without overheating—in conjunction with a key duplication attachment system constructed in accordance with the present invention—affords many advantages over conventional duplicating systems. The duplicating operation requires considerably less time, and the system can be used to grind-cut keys made of steel, brass, iron. No high pitch sounds are emitted that would eventually injure one's hearing. A more accurate duplication of the pattern contour from the specimen key results, with cleaner, sharper grinding of the contour pattern, while the force imparted to the key blank is substantially reduced, thereby increasing the stability of the clamping vise. The need for complex and cumbersome mechanisms for automatic feed cutting and tracing, a common feature of conventional duplication machines and devices, is entirely avoided.

What is claimed is:

1. A method of forming a duplicate of an original key from a key blank, comprising the steps of:
    providing a key duplicating attachment including a base and a carriage movable linearly and angularly relative to the base;
    attaching, to the carriage, a rotary tool including an elongated dielectric housing and a high speed motor having a rotary shaft;
    coupling a cutting element to the rotary shaft of the high speed motor;
    clamping a key blank and an original key to the base in respectively fixed positions relative to one another;
    securing a stylus to the carriage such that when an engagement surface of the stylus contacts a reference surface of the original key, the cutting element contacts a corresponding target surface of the key blank; and
    while the rotary shaft of the high speed motor is rotating the cutting element, manipulating the dielectric housing so as to move the carriage relative to the base and to bring the stylus and abrasive cutting element into contact with the original key and key blank, respectively.

2. The method of claim 1, wherein a cutting element defining an abrasive surface adapted to grind material from a key blank is coupled to the rotary shaft during the coupling step.

3. The method of claim 2, wherein the dielectric housing has a threaded tip proximate the rotary shaft and wherein said step of attaching includes the steps of inserting the threaded tip through a mounting hole defined in the carriage and then tightening a correspondingly threaded nut around the threaded tip.

4. A key duplication system for fabricating a duplicate of an original key from a key blank comprising, in combination:
    a base;
    a first clamp securable to the base, said clamp being dimensioned and arranged to receive and retain a key blank in a fixed position and angular orientation relative to the base;
    a second clamp securable to the base, said clamp being dimensioned and arranged to receive and retain an original key in a fixed position and angular orientation relative to the base;
    a carriage movable linearly relative to said base, said first clamp, and said second clamp, said carriage including a stylus having an engagement surface dimensioned and arranged to contact a selected corresponding surface region of an original key retained by said second clamp;
    a cutting element; and
    a high speed motor detachably secured to the carriage and having a rotary shaft in driving engagement with the cutting element, said high speed motor being disposed within an elongated dielectric housing of a rotary power tool and said dielectric housing being dimensioned and arranged to serve, while secured to the carriage, as a handle manipulable to produce linear and angular translation of the carriage relative to the base.

5. The key duplication system of claim 4, wherein the cutting element is an abrasive cutting element adapted to remove material from the key blank solely by abrasion, the stylus and the abrasive cutting element having an identical cross-sectional profile and having respective engagement surfaces separated by a distance equal to a distance between a tip of an original key retained in said second clamp and a tip of a key blank retained in said first clamp.

6. The key duplication system of claim 4, wherein said base is adapted to be stationary and wherein said carriage is adapted to be movable during a key duplication operation, and wherein said carriage includes a retaining arm defining a mounting region for receiving and retaining the rotary power tool in a fixed orientation relative to the carriage.

7. The key duplication system of claim 4, further including a chuck attached to the rotary shaft and dimensioned to retain said cutting element during linear or angular manipulation of said carriage.

8. The key duplication system of claim 4, wherein said dielectric housing has a threaded tip and wherein said system further includes a correspondingly threaded locking nut for securing the dielectric housing to said carriage.

9. The key duplication system of claim 4, wherein said carriage is hingedly secured to said base.

10. The key duplication system of claim 9, wherein said base defines first and second axially aligned bores and wherein said carriage defines first and second guide rods dimensioned and arranged for sliding and pivoting movement within said first and second axially aligned bores, respectively.

11. The key duplication system of claim 4, further including a transparent safety cover securable to the carriage and adapted for angular and linear movement therewith, said cover being dimensioned and arranged to cover an original key and key blank when said stylus and said cutting element are in respective engagement therewith.

12. The key duplication system of claim 4, wherein said base has a substantially planar bottom surface to accommodate placement on a horizontal support surface, and wherein said first and second clamping devices are secured to said base at an acute angle of inclination relative to said planar bottom surface.

13. For use with a rotary power tool including an elongated dielectric housing and a high-speed motor having a rotary shaft disposed within the dielectric housing, a key duplicating attachment comprising:

a base;

a first clamp securable to the base, said clamp being dimensioned and arranged to receive and retain a key blank in a fixed position and angular orientation relative to the base;

a second clamp securable to the base, said clamp being dimensioned and arranged to receive and retain an original key in a fixed position and angular orientation relative to the base;

a carriage movable linearly and angularly relative to said base, said first clamp, and said second clamp, said carriage including a stylus having a surface dimensioned and arranged to contact a selected corresponding surface region of an original key retained by said second clamp; and a cutting element adapted to be driven by the rotary shaft of the high speed motor, wherein said carriage defines a mounting region dimensioned and arranged to releasably retain the rotary tool whereby the dielectric housing serves as a handle, manipulable to produce linear and angular manipulation of the carriage relative to the base, while the rotary tool is secured to the carriage.

14. The attachment of claim 13, wherein the cutting element has an abrasive surface adapted to grind material from a key blank and wherein the stylus and the cutting element have an identical cross-sectional profile and have respective engagement surfaces separated, while the high speed motor is secured to the carriage, by a distance between a tip of an original key retained in said second clamp and a tip of a key blank retained in said first clamp.

15. The attachment of claim 13, wherein base is adapted to be stationary and wherein said carriage is adapted to be moved linearly and angularly during a key duplication operation.

16. The attachment of claim 15, wherein the dielectric housing has a threaded tip and the attachment further includes a correspondingly threaded locking nut for securing the dielectric housing to the mounting region of said carriage.

17. The attachment of claim 13, wherein said carriage is hingedly secured to said base.

18. The attachment of claim 17, wherein said base defines first and second axially aligned bores and wherein said carriage defines first and second guide rods dimensioned for sliding and pivoting movement within said first and second axially aligned bores, respectively.

19. The attachment of claim 13, further including a transparent safety cover securable to the carriage and adapted for angular and linear movement therewith, said cover being dimensioned and arranged to cover an original key and key blank when said stylus and abrasive element are in respective engagement therewith.

20. The attachment of claim 13, wherein said base has a substantially planar bottom surface to accommodate placement on a horizontal support surface, and wherein said first and second clamping devices are secured to said base at an acute angle of inclination relative to said planar bottom surface.

21. For use with a high-speed motor having a rotary shaft, a key duplicating arrangement comprising:

a base;

clamp means for receiving and retaining a key blank and an original key in respectively fixed positions relative to one another and to said base in a common inclined plane;

a carriage movable linearly and angularly relative to said base, said carriage including a stylus having an engagement surface dimensioned and arranged to contact a selected reference surface region of an original key retained by said clamp means; and a cutting element adapted to be driven by the rotary shaft of the high speed motor and moved into engagement with a target surface of the key blank as the engagement surface of the stylus contacts a correspondingly selected reference surface region of an original key, wherein the cutting element has an abrasive surface and wherein the stylus and the cutting element have an identical cross-sectional profile and have respective engagement surfaces separated, while the high speed motor is secured to the carriage, by a distance equal to a distance between a tip of an original key retained in said clamp means and a tip of a key blank retained in said clamp means and wherein the high speed motor is disposed within an elongated electric housing of a rotary power tool, the carriage defining a mounting region dimensioned and arranged such that the dielectric housing serves as a handle, manipulable to produce linear and angular manipulation of the carriage relative to the base, while the rotary tool is attached to the carriage.

22. The attachment of claim 21, wherein the dielectric housing has a threaded tip and the attachment further includes a correspondingly threaded locking nut for securing the dielectric housing to the mounting region of said carriage.

23. The attachment of claim 21, wherein said carriage is hingedly secured to said base.

24. The attachment of claim 23, wherein said base defines first and second axially aligned bores and wherein said carriage defines first and second guide rods dimensioned for sliding and pivoting movement within said first and second axially aligned bores, respectively.

* * * * *